United States Patent
Liu et al.

(10) Patent No.: US 10,284,298 B2
(45) Date of Patent: May 7, 2019

(54) METHOD FOR AWAKING OPTICAL NETWORK UNIT IN PASSIVE OPTICAL NETWORK, DEVICE, AND SYSTEM

(71) Applicant: HUAWEI TECHNOLOGIES CO., LTD., Shenzhen, Guangdong (CN)

(72) Inventors: Haixiong Liu, Wuhan (CN); Gang Zheng, Shenzhen (CN); Xifeng Wan, Munich (DE); Dongsheng Yue, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/635,992

(22) Filed: Jun. 28, 2017

(65) Prior Publication Data
US 2017/0302380 A1 Oct. 19, 2017

Related U.S. Application Data

(63) Continuation of application No. PCT/CN2014/095372, filed on Dec. 29, 2014.

(51) Int. Cl.
*H04B 10/00* (2013.01)
*H04B 10/27* (2013.01)
(Continued)

(52) U.S. Cl.
CPC ............ *H04B 10/27* (2013.01); *H04B 10/66* (2013.01)

(58) Field of Classification Search
CPC .. H04B 10/27; H04J 14/0227; H04Q 11/0067
See application file for complete search history.

(56) References Cited

U.S. PATENT DOCUMENTS 8,548,327 B2    10/2013   Hirth et al.
2011/0142442 A1  6/2011   Hirth et al.
(Continued)

FOREIGN PATENT DOCUMENTS

CN    101132233 A    2/2008
CN    101877611 A    11/2010
(Continued)

OTHER PUBLICATIONS

International Search Report dated Sep. 10, 2015 in corresponding International Patent Application No. PCT/CN2014/095372.
(Continued)

*Primary Examiner* — Daniel G Dobson
(74) *Attorney, Agent, or Firm* — Staas & Halsey LLP

(57) ABSTRACT

Embodiments of the present invention disclose a method for awaking an optical network unit in a passive optical network, including: receiving, by an optical line terminal OLT, a service packet corresponding to an ONU in an energy-saving mode, where the service packet carries a packet feature, and the packet feature indicates a service type of the service packet; detecting, by the OLT, the packet feature of the service packet; and when the packet feature of the service packet is a preset packet feature of needing to awake the ONU, awaking, by the OLT, the ONU in the energy-saving mode. According to the technical solutions provided in the embodiments of the present invention, an ONU can be awoken from an energy-saving mode in time when a traffic rate at an initial service stage is small, and a high QoS requirement of a service is met.

17 Claims, 8 Drawing Sheets

(51) Int. Cl.
  *H04B 10/66* (2013.01)
  *H04J 14/00* (2006.01)

(56) References Cited

U.S. PATENT DOCUMENTS

| 2011/0211837 A1 | 9/2011 | Sugawa et al. |
| 2012/0166819 A1* | 6/2012 | Skubic ................. G06F 1/3278 713/300 |
| 2013/0294775 A1 | 11/2013 | Hirth et al. |

FOREIGN PATENT DOCUMENTS

| CN | 102170598 A | 8/2011 |
| EP | 2362675 A2 | 8/2011 |
| WO | 2014/012109 A1 | 1/2014 |

OTHER PUBLICATIONS

Burak Kantarci et al.: "Towards Energy-Efficient Hybrid Fiber-Wireless Access Networks," Transparent Optical Networks (ICTON), 2011 13$^{TH}$ International Conference on, IEEE, Jun. 26, 2011, pp. 1-4, XP031911678.
Partial Supplementary European Search Report dated Nov. 22, 2017 in corresponding European Patent Application No. 14909326.2.
International Search Report dated Oct. 9, 2015 in corresponding International Application No. PCT/CN2014/095372.
Chinese Office Action dated Jul. 31, 2018, in corresponding Chinese Patent Application No. 201480077062.0, 9 pgs.

\* cited by examiner

METHOD FOR AWAKING OPTICAL NETWORK UNIT IN PASSIVE OPTICAL NETWORK, DEVICE, AND SYSTEM

CROSS-REFERENCE TO RELATED APPLICATIONS

This application is a continuation of International Application No. PCT/CN2014/095372, filed on Dec. 29, 2014, the disclosure of which is hereby incorporated by reference in its entirety.

TECHNICAL FIELD

The present invention relates to the field of optical communications, and in particular, to a method for awaking an optical network unit in a passive optical network, a device, and a system.

BACKGROUND

Compared with a cable transmission technology, an optical fiber transmission technology has advantages such as a large capacity, a small loss, and a strong anti-electromagnetic interference capability. Therefore, as costs of optical fiber transmission gradually decrease, an optical fiber access network is an inevitable development trend. An access network segment representing a "last mile" requires ultra-low costs, a simple structure, easy implementation, and the like. This brings a great challenge to technical implementation. A Passive Optical NetworkPON uses a passive device, and is currently the most promising technology for implementing a broadband optical access network. Based on carried content, PON technologies mainly include an APON (Asynchronous Transfer Mode Passive Optical Network, asynchronous transfer mode passive optical network), an EPON (Ethernet Passive Optical Network, Ethernet passive optical network), a GPON (Gigabit Passive Optical Network, gigabit passive optical network), and the like.

The International Telecommunications Union Telecommunication Standardization Sector has been exploring solutions to reduce energy consumption in a PON range. These energy-saving solutions can improve performance of a battery powered device, and can save energy and reduce dioxide emissions as a whole. With the popularization of the PON, a quantity of deployed ONUs also increases. Therefore, a PON energy-saving solution is essentially to reduce power consumption of an ONU.

How to trigger an awaking event when an ONU is in an energy-saving mode is not defined in a standard. According to a universal technology in the industry, a PON port traffic detection method is used to trigger an awaking event. Specifically, when an ONU is in the energy-saving mode, the ONU detects received and sent traffic on a PON port, and triggers an awaking event when a traffic rate is greater than a threshold. An OLT also detects the received and sent traffic on the PON port of the ONU, and triggers an awaking event when the traffic rate is greater than the threshold.

The universal PON port traffic detection method has the following disadvantages:

(1) Some services have a strict requirement for a delay time. PON port traffic detection requires periodic sampling and does not support immediate awaking, and therefore cannot meet a high QoS (Quality of Service, quality of service) requirement of the services.

(2) It is difficult to configure a value of a threshold in the PON port traffic detection method. The threshold needs to be analyzed and calculated with reference to a specific network situation.

(3) A traffic rate at an initial stage is small for some services, and cannot reach an awaking threshold at a signaling interaction stage. As a result, the ONU cannot be awoken in time.

SUMMARY

In view of this, embodiments of the invention provide a method for awaking an optical network unit in a passive optical network, a device, and a system, to resolve a problem that an ONU cannot be awoken in time when a service has a high requirement for a delay time or a traffic rate at an initial service stage is small.

According to a first aspect, an embodiment of the present invention provides a method for awaking an optical network unit ONU in a passive optical network PON, including: receiving, by an optical line terminal OLT, a service packet corresponding to an ONU in an energy-saving mode, where the service packet carries a packet feature, and the packet feature indicates a service type of the service packet; detecting, by the OLT, the packet feature of the service packet; and when the packet feature of the service packet is a preset packet feature of needing to awake the ONU, awaking, by the OLT, the ONU in the energy-saving mode.

With reference to an implementation of the first aspect, in a first possible implementation of the first aspect, the preset packet feature of needing to awake the ONU includes: a packet feature indicating a voice service and/or a packet feature indicating a video service.

With reference to the first aspect or the first possible implementation of the first aspect, in a second possible implementation of the first aspect, the energy-saving mode includes a state in which a sending module of the ONU is enabled, and the receiving, by an OLT, a service packet corresponding to an ONU in an energy-saving mode includes: when the ONU in the energy-saving mode is in the state in which the sending module is enabled, receiving, by the OLT, the service packet of the ONU in the energy-saving mode.

With reference to any one of the first aspect, or the first to the second possible implementations of the first aspect, in a third possible implementation of the first aspect, the receiving, by an OLT, a service packet corresponding to an ONU in an energy-saving mode includes: receiving, by the OLT, the service packet that is sent to the ONU in the energy-saving mode from a network-side device.

With reference to any one of the first aspect, or the first to the third possible implementations of the first aspect, in a fourth possible implementation of the first aspect, the energy-saving mode includes a state in which a receiving module of the ONU is enabled, and the awaking, by the OLT, the ONU in the energy-saving mode includes: when the ONU in the energy-saving mode is in the state in which the receiving module is enabled, awaking, by the OLT, the ONU in the energy-saving mode.

With reference to any one of the first aspect, or the first to the fourth possible implementations of the first aspect, in a fifth possible implementation of the first aspect, before the receiving, by an OLT, a service packet corresponding to an ONU in an energy-saving mode, the method includes: receiving, by the OLT, the preset packet feature of needing to awake the ONU, where the preset packet feature is from the ONU.

With reference to any one of the first aspect, or the first to the fifth possible implementations of the first aspect, in a sixth possible implementation of the first aspect, before the receiving, by an OLT, a service packet corresponding to an ONU in an energy-saving mode, the method includes: setting, by the OLT, the preset packet feature of needing to awake the ONU.

With reference to any one of the first aspect, or the first to the sixth possible implementations of the first aspect, in a seventh possible implementation of the first aspect, the energy-saving mode includes a cyclic sleep mode, where in the cyclic sleep mode, the ONU is cyclically switched between a sleep aware state and an asleep state, the receiving module and the sending module are in the enabled state when the ONU is in the sleep aware state, and the receiving module and the sending module are in a disabled state when the ONU is in the asleep state.

With reference to any one of the first aspect, or the first to the seventh possible implementations of the first aspect, in an eighth possible implementation of the first aspect, the energy-saving mode includes a doze mode, where in the doze mode, the ONU is cyclically switched between a doze aware state and a listen state, the receiving module and the sending module are in the enabled state when the ONU is in the doze aware state, and the sending module is in a disabled state and the receiving module is in the enabled state when the ONU is in the listen state.

With reference to any one of the first aspect, or the first to the eighth possible implementations of the first aspect, in a ninth possible implementation of the first aspect, the awaking, by the OLT, the ONU in the energy-saving mode specifically includes: instructing, by the OLT by using a forced wakeup indication FWI, the ONU to be awoken from the energy-saving mode.

With reference to any one of the first aspect, or the first to the ninth possible implementations of the first aspect, in a tenth possible implementation of the first aspect, after the awaking, by the OLT, the ONU in the energy-saving mode, the ONU is in an active mode, and in the active mode, a receiving module and a sending module of the ONU keep in an enabled state.

With reference to any one of the first aspect, or the first to the tenth possible implementations of the first aspect, in an eleventh possible implementation of the first aspect, the packet feature includes: at least one of a virtual local area network identifier VLAN ID, a differentiated services code point DSCP value of an IP packet, a Transmission Control Protocol TCP port number, a User Datagram Protocol UDP port number, or an 802.1p priority.

According to a second aspect, an embodiment of the present invention provides a method for awaking an optical network unit ONU in a passive optical network PON, including: receiving, by an ONU, a service packet when the ONU is in an energy-saving mode, where the service packet carries a packet feature, and the packet feature indicates a service type of the service packet; detecting, by the ONU, the packet feature of the service packet; and when the packet feature is a preset packet feature of needing to awake the ONU, awaking the ONU from the energy-saving mode.

With reference to an implementation of the second aspect, in a first possible implementation of the second aspect, the preset packet feature of needing to awake the ONU includes: a packet feature indicating a voice service and/or a packet feature indicating a video service.

With reference to the second aspect or the first possible implementation of the second aspect, in a second possible implementation of the second aspect, before the ONU is in the energy-saving mode, the method includes: setting, by the ONU, the preset packet feature of needing to awake the ONU.

With reference to any one of the second aspect, or the first to the second possible implementations of the second aspect, in a third possible implementation of the second aspect, before the ONU is in the energy-saving mode, the method includes: receiving, by the ONU, the preset packet feature of needing to awake the ONU, where the preset packet feature is from an OLT.

With reference to any one of the second aspect, or the first to the third possible implementations of the second aspect, in a fourth possible implementation of the second aspect, the receiving, by an ONU, a service packet when the ONU is in an energy-saving mode includes: receiving, by the ONU, the service packet from a user-side device.

With reference to any one of the second aspect, or the first to the fourth possible implementations of the second aspect, in a fifth possible implementation of the second aspect, the energy-saving mode includes a state in which a receiving module of the ONU is enabled, and the receiving, by an ONU, a service packet when the ONU is in an energy-saving mode includes: receiving, by the ONU, the service packet from a network-side device.

With reference to any one of the second aspect, or the first to the fifth possible implementations of the second aspect, in a sixth possible implementation of the second aspect, the awaking the ONU from the energy-saving mode specifically includes: instructing, by the ONU by using a local wakeup indication LWI, the ONU to be awoken from the energy-saving mode.

With reference to any one of the second aspect, or the first to the sixth possible implementations of the second aspect, in a seventh possible implementation of the second aspect, after the awaking the ONU from the energy-saving mode, the ONU is in an active mode, and in the active mode, a receiving module and a sending module of the ONU keep in an enabled state.

With reference to any one of the second aspect, or the first to the seventh possible implementations of the second aspect, in an eighth possible implementation of the second aspect, the packet feature includes: at least one of a virtual local area network identifier VLAN ID, a differentiated services code point DSCP value of an IP packet, a Transmission Control Protocol TCP port number, a User Datagram Protocol UDP port number, or an 802.1p priority.

According to a third aspect, an embodiment of the present invention provides an optical line terminal OLT, where the OLT includes: a receiving unit, configured to receive a service packet corresponding to an ONU in an energy-saving mode, where the service packet carries a packet feature, and the packet feature indicates a service type of the service packet; a detection unit, configured to detect the packet feature of the service packet; and an awaking unit, configured to: when the packet feature of the service packet is a preset packet feature of needing to awake the ONU, awake, by the OLT, the ONU in the energy-saving mode.

With reference to an implementation of the third aspect, in a first possible implementation of the third aspect, the preset packet feature of needing to awake the ONU includes: a packet feature of a voice service and/or a packet feature indicating a video service.

With reference to the third aspect or the first possible implementation of the third aspect, in a second possible implementation of the third aspect, the OLT further includes: a packet feature configuration unit, configured to receive the preset packet feature of needing to awake the ONU, where the preset packet feature is from the ONU.

With reference to any one of the third aspect, or the first to the second possible implementations of the third aspect, in a third possible implementation of the third aspect, the OLT further includes: a packet feature setting unit, configured to set the preset packet feature of needing to awake the ONU.

With reference to any one of the third aspect, or the first to the third possible implementations of the third aspect, in a fourth possible implementation of the third aspect, the awaking unit is configured to instruct, by using a forced wakeup indication FWI, the ONU to be awoken from the energy-saving mode.

With reference to any one of the third aspect, or the first to the fourth possible implementations of the third aspect, in a fifth possible implementation of the third aspect, the packet feature includes: at least one of a virtual local area network identifier VLAN ID, a differentiated services code point DSCP value of an IP packet, a Transmission Control Protocol TCP port number, a User Datagram Protocol UDP port number, or an 802.1p priority.

According to a fourth aspect, an embodiment of the present invention provides an optical network unit ONU, where the ONU includes: a receiving unit, configured to receive a service packet, where the service packet carries a packet feature, and the packet feature indicates a service type of the service packet; a detection unit, configured to detect the packet feature of the service packet; and an awaking unit, configured to: when the packet feature is a preset packet feature of needing to awake the ONU, awake the ONU from the energy-saving mode.

With reference to an implementation of the fourth aspect, in a first possible implementation of the fourth aspect, the preset packet feature of needing to awake the ONU includes: a packet feature of a voice service and/or a packet feature of a video service.

With reference to the fourth aspect or the first possible implementation of the fourth aspect, in a second possible implementation of the fourth aspect, the ONU further includes: a packet feature setting unit, configured to set the preset packet feature of needing to awake the ONU.

With reference to any one of the fourth aspect, or the first to the second possible implementations of the fourth aspect, in a third possible implementation of the fourth aspect, the ONU further includes: a packet feature configuration unit, configured to receive the preset packet feature of needing to awake the ONU, where the preset packet feature is from an OLT.

With reference to any one of the fourth aspect, or the first to the third possible implementations of the fourth aspect, in a fourth possible implementation of the fourth aspect, the awaking unit is configured to instruct, by using a local wakeup indication LWI, the ONU to be awoken from the energy-saving mode.

With reference to any one of the fourth aspect, or the first to the fourth possible implementations of the fourth aspect, in a fifth possible implementation of the fourth aspect, the packet feature includes: at least one of a virtual local area network identifier VLAN ID, a differentiated services code point DSCP value of an IP packet, a Transmission Control Protocol TCP port number, a User Datagram Protocol UDP port number, or an 802.1p priority.

According to a fifth aspect, an embodiment of the present invention provides a system for awaking an optical network unit (ONU) in a passive optical network (PON), where the system includes an OLT and an ONU. The OLT is configured to receive a service packet corresponding to the ONU in an energy-saving mode, where the service packet carries a packet feature, and the packet feature indicates a service type of the service packet; and the OLT is configured to: detect the packet feature of the service packet, and when the packet feature of the service packet is a preset packet feature of needing to awake the ONU, awake the ONU in the energy-saving mode. The ONU is configured to be awoken from the energy-saving mode.

According to a sixth aspect, an embodiment of the present invention provides a system for awaking an optical network unit ONU in a passive optical network PON, where the system includes an OLT and an ONU. The ONU is configured to receive a service packet, where the service packet carries a packet feature, and the packet feature indicates a service type of the service packet; and the ONU is configured to detect the packet feature of the service packet, and when the packet feature of the service packet is a preset packet feature of needing to awake the ONU, send an awaking instruction request to the OLT. The OLT is configured to: receive an awaking instruction of the ONU, and instruct the ONU to be awoken from an energy-saving mode.

According to a seventh aspect, an optical line terminal OLT is provided, including: a processor, a memory, a bus, and a communications interface, where the memory is configured to store an execution instruction, the processor and the memory are connected by using the bus, and when the OLT runs, the processor executes the execution instruction stored in the memory, so that the OLT executes the method according to the first aspect and any possible implementation of the first aspect.

According to an eighth aspect, an optical network unit ONU is provided, including: a processor, a memory, a bus, and a communications interface, where the memory is configured to store an execution instruction, the processor and the memory are connected by using the bus, and when the ONU runs, the processor executes the execution instruction stored in the memory, so that the ONU executes the method according to the second aspect and any possible implementation of the second aspect.

According to the technical solutions provided in the embodiments of the present invention, a packet feature of needing to awake an ONU is preset on an OLT and the ONU, where the packet feature indicates a service type of a service packet. When the OLT receives a service packet and when the OLT or the ONU detects that a packet feature of the service packet is the preset packet feature of needing to awake the ONU, the ONU is triggered to be awoken from an energy-saving mode. In this way, a packet feature can be used as a trigger condition for awaking an ONU, and no awaking threshold needs to be determined. This ensures that the ONU can be awoken in time even when a traffic rate at an initial service stage is small, and also meets a high QoS requirement of a service.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and persons of ordinary skill in the art may still derive other accompanying drawings or embodiments according to these drawings or description without creative efforts, and the present invention aims to cover all these derived accompanying drawings or embodiments.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
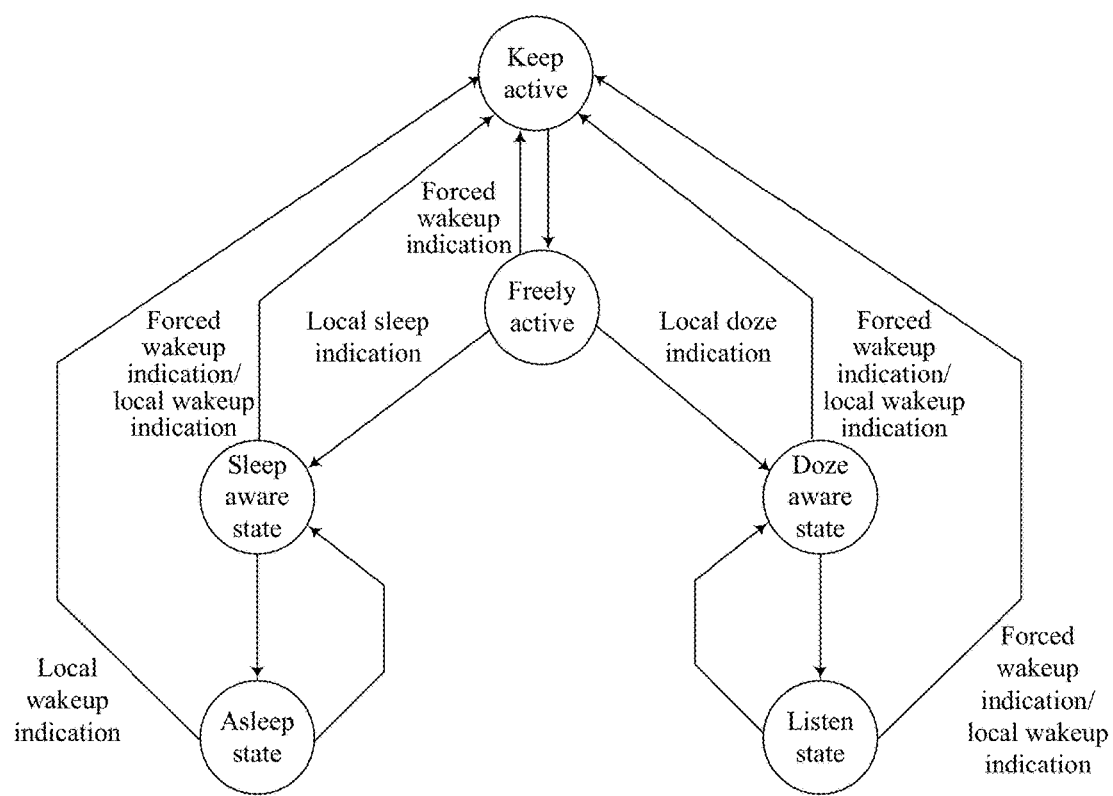
FIG. 1 is a schematic structural diagram of a PON system.

Typically, a PON is used as "the first mile" of a network, and provides a connection between a central office (CO) of a service provider and customer premises. As shown in FIG. 1, an entire PON system is generally constituted by an optical line terminal (OLT) located in the central office and a series of optical network units (ONU) in the customer premises. These components are covered by an optical distribution network (ODN) constituted by an optical fiber and a passive optical splitter or coupler. Generally, "the first mile" is a point-to-multipoint network, that is, one central office serves a given quantity of users. For example, the PON may use a tree-like topology. The OLT in the central office is connected to the passive optical splitter or coupler in the ODN by using a feeder fiber. By using a given quantity of distribution fibers, the passive optical splitter may separate downlink optical signals and allocate them to users, and the passive coupler synthesizes uplink optical signals from the users.

The entire PON system has a medium sharing feature due to existence of the ODN. On a downlink, data is sent by means of broadcasting. The OLT broadcasts a data packet to all ONUs. A time window granting message frame sent by the OLT to the ONU generally includes two pieces of information: a start time of allowing the ONU to enable sending of an optical module, and duration of allowing the ONU to enable sending of the optical module. The OLT dynamically allocates a granted time window to each ONU according to a bandwidth requirement of the ONU, so that bandwidth used by the ONU may be dynamically changed and accord with a preset bandwidth policy. This computing and scheduling process is referred to as a Dynamically Bandwidth Assignment (DBA) algorithm. Uplink traffic transmission is relatively complex. To avoid an uplink data conflict, a Time Division Multiple Access technology (TDMA) mode is used for an uplink data stream. That is, the OLT in the central office grants a time window for each ONU in the network, and ONUs for which different time windows are granted send uplink data within different time segments. In this way, no conflict occurs on uplink data of different ONUs. Therefore, the ONU transmits data according to a control requirement of the OLT.

Figure 2:
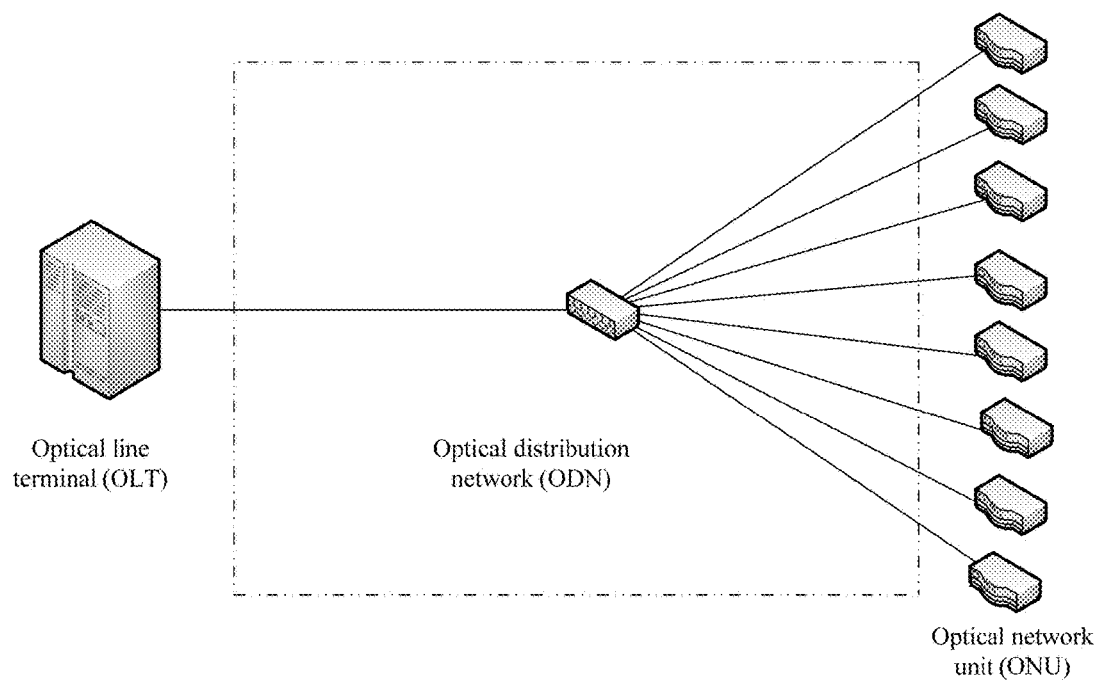
FIG. 2 is a schematic diagram of state transition of an ONU in an energy-saving mode in a PON.

The OLT uses the passive optical splitter to divide one channel of optical signal into multiple channels of optical signals, and is connected to the ONU by using the optical fiber. In a case of a high split ratio, one OLT corresponds to a huge quantity of ONUs. Therefore, to reduce power consumption of the ONU, the ONU has two energy-saving modes: a cyclic sleep (Cyclic Sleep) mode and a doze (Doze) mode. FIG. 2 is a schematic diagram of state transition of an ONU in an energy-saving mode in a PON.

(1) Cyclic Sleep Mode

The ONU is cyclically switched between the following two states: a sleep aware (Sleep Aware) state and an asleep (Asleep) state. In the sleep aware state, all hardware components such as optical modules in receiving and sending directions work normally, and in this case, energy cannot be saved. When the ONU is in the asleep state, all the hardware components such as the optical modules in the receiving and sending directions are disabled, and in this case, energy consumption of the ONU decreases.

(2) Doze Mode

The ONU is cyclically switched between the following two states: a doze aware (Doze Aware) state and a listen (Listen) state. In the doze aware state, all the hardware components such as the optical modules in the receiving and sending directions work normally, and in this case, energy cannot be saved. When the ONU is in the listen state, a hardware component such as an optical module in the sending direction is disabled, and in this case, energy consumption of the ONU decreases.

The cyclic sleep mode generally occurs in a scenario in which the ONU is not used by a user, for example, within a time segment in which the user has a sleep at night, and in this case, more energy consumption is reduced. The doze mode generally occurs in a scenario in which a user uses a downlink service only and does not use an uplink service, for example, within a time segment in which the user watches multicast channels on IPTV (interactive personality television), and in this case, little energy consumption is reduced.

After entering the energy-saving mode, the ONU generally triggers an awaking event by using a PON port traffic detection method, so that the ONU is awoken from the energy-saving mode. The ONU supports multiple services, for example, a voice service, a data service, and a video service that are included in a typical triple playservice. The voice service includes a Voice over IP VOIP service. The data service includes Internet services such as a broadband service based on a computer network and a broadband service based on a cable television network. The video service includes television services such as an interactive personality television IPTV service, a mobile television service, and a digital television service. In these services, some services have a strict requirement for a delay time, for example, an uplink service packet of the IPTV service includes channel selection information of a user, directly affecting user experience; some services have a small traffic rate at an initial stage, for example, for the VOIP service, a traffic rate at an initial service stage cannot reach an awaking threshold, affecting user experience. Therefore, in these cases, when the traffic detection method is used, the ONU cannot be awoken in time. For this case, in this embodiment of the present invention, a packet feature that is of needing to awake the ONU and that is preset on the OLT and the ONU is used as a trigger condition for awaking the ONU in the energy-saving mode. When the OLT or the ONU receives a service packet and detects that a packet feature of the service packet is the packet feature of needing to awake the ONU, an energy-saving awaking event is triggered, and the ONU in the energy-saving mode can be awoken in time. The preset packet feature, mentioned herein and in other embodiments, of needing to awake the ONU may be a packet feature carried in a service packet, of a corresponding service type on the ONU, with a small traffic rate at an initial service stage or a high QoS requirement of a service.

Specifically, the packet feature may indicate a service type, including but not limited to the following several types: a VLAN ID, 802.1p, an Ethernet packet type, a DSCP value of an IP packet, a TCP port number, and a UDP port. Specifically, the VLAN ID and 802.1p are fields in a tagged frame (tagged Frame). The VLAN ID indicates a virtual local area network to which the data frame belongs, and is generally planned and set by an operator. 802.1p indicates a priority of the data frame. The Ethernet packet type indicates a standard Ethernet frame, and is also referred to as a type field of an untagged frame (untagged Frame). The DSCP value of the IP packet indicates a priority of a datagram. The TCP port number and the UDP port include a source port and a destination port, and are used to identify and distinguish application processes of a source end device and a destination end device. Each service type, for example, the voice service, the data service, and the video service, may be expressed by setting one or a combination of the foregoing packet features in a packet header of a service packet.

In a specific implementation process, the packet feature of needing to awake the ONU may include a packet feature of a voice service and a packet feature of a video service. The voice service includes a VOIP service, and the video service includes an IPTV service. For the VOIP service, the ONU needs to be awoken in time at an initial service stage. For the IPTV service, an uplink service packet includes channel selection information of a user, and therefore the ONU also needs to be awoken in time. For each service type, a packet feature of a service packet is not set in a unique manner, and is generally set by a developer or an operator. For example, when a value of a VLAN ID is 6, a DSCP value of an IP packet is 47, a TCP port number and a UDP port number are 5060, it indicates that the packet feature is a packet feature of a voice service; or when a value of a VLAN ID is 4, an 802.1p priority is 7, and a DSCP value of an IP packet is 56, it indicates that the service packet is the packet feature of the video service. A packet feature of the data service is generally expressed by using the VLAN ID, the 802.1p priority, and the DSCP value of the IP packet, and is generally planned and set by an operator.

Embodiment 2

Figure 3:
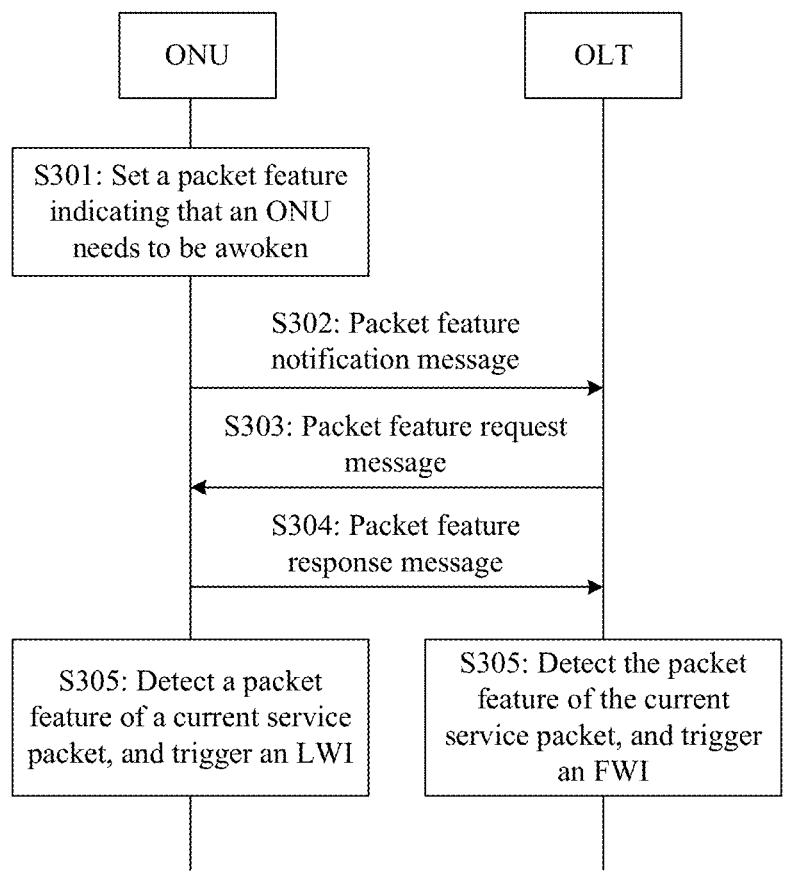
FIG. 3 is a signaling interaction diagram of a method for awaking an optical network unit ONU in a passive optical network PON according to an embodiment of the present invention.

FIG. 3 is a signaling interaction diagram of a method for awaking an optical network unit ONU in a passive optical network PON according to an embodiment of the present invention. In this embodiment, an ONU sets a packet feature of needing to awake the ONU, configures, for an OLT, the packet feature of needing to awake the ONU, and uses, as a trigger condition for awaking the ONU from an energy-saving mode, the preset packet feature of needing to awake the ONU. Specifically, in a GPON protocol, the ONU configures the packet feature for the OLT by newly adding a management entity. In an EPON protocol, the ONU configures the packet feature for the OLT by means of an extended OAM (Operation, Administration and Maintenance, operation, administration and maintenance) message.

S301: The ONU sets a packet feature of needing to awake the ONU.

Services such as voice, data, and video services need to be activated by using a service management channel before being established. There are two implementations of setting, by the ONU, the packet feature of needing to awake the ONU. In one implementation, for a gateway ONU, when the ONU communicates with a service management network element (for example, an iTMS or a BMS), the service management network element delivers, to the ONU, underlying channel information and QoS planning information that are of a service that needs to be activated, and the ONU may extract, from the information, a packet feature of a service packet in each activated service type. In addition, when the ONU performs signaling interaction with a service server (for example, a voice server), they may also negotiate a packet feature of a service packet. The ONU may extract a packet feature in the foregoing implementation, and set the packet feature of needing to awake the ONU. In the other implementation, for a bridged ONU, the ONU cannot actively extract a packet feature of a service packet. Therefore, the packet feature of needing to awake the ONU may be set by using a user interface of the ONU or may be customized at delivery. Specifically, the packet feature, set on the ONU, of needing to awake the ONU includes a packet feature of a voice service and a packet feature of a video service.

S302: The ONU sends a packet feature notification message to the OLT.

After setting the packet feature of needing to awake the ONU, the ONU sends the packet feature notification message to the OLT, indicating that setting of the packet feature is completed.

In a GPON protocol, the ONU sends the packet feature notification message to the OLT by using a newly added management entity. Specifically, the packet feature notification message is an AVC (Attribute Value Change, attribute value change) message. An attribute index field in the AVC message indicates that setting of a packet feature entry in a packet feature table is completed.

In an EPON protocol, the ONU sends the packet feature notification message to the OLT by using an extended OAM message. Specifically, a branch field and a leaf field in the OAM message indicate that an attribute of the message is a private extension. Values of both the branch field and the leaf field are customized and unique. The message carries a field indicating that setting of the packet feature by the ONU is completed, but specific content of the packet feature may not be carried in the message. Specifically, a service type quantity N indicated by the packet feature, set by the ONU, of needing to awake the ONU may be carried.

S303: The OLT sends a packet feature request message to the ONU.

Specifically, the OLT sends the packet feature request message to the ONU to request querying the packet feature, set by the ONU, of needing to awake the ONU.

In the GPON protocol, the OLT obtains, by sending a get or get next message to the ONU, the packet feature, set by the ONU, of needing to awake the ONU.

In the EPON protocol, the packet feature request message sent by the OLT to the ONU is implemented by using an extended OAM message. Extended operation code in the message indicates that the message is an extended get request message sent by the OLT to the ONU. A branch field and a leaf field indicate that an attribute of the message is a private extension. Values of both the branch field and the leaf field are customized and unique.

S304: The ONU sends a packet feature response message to the OLT.

The packet feature response message sent by the ONU to the OLT carries the packet feature, set by the ONU, of needing to awake the ONU. The OLT performs packet feature configuration according to the received packet feature. The packet feature, configured by the OLT, of needing to awake the ONU includes the packet feature of the voice service and the packet feature of the video service.

In the GPON protocol, the ONU sends the packet feature response message to the OLT by using a newly added management entity. Specifically, the packet feature response message sent by the ONU to the OLT is a get response message. The message carries a packet feature table, and each entry in the packet feature table represents a value of a packet feature.

In the EPON protocol, the ONU sends the packet feature response message to the OLT by using an extended OAM message. Specifically, extended operation code in the message indicates that the message is an extended get response message sent by the ONU to the OLT. A branch field and a leaf field indicate that an attribute of the message is a private extension. Values of both the branch field and the leaf field are customized and unique. The message carries a packet feature table, and each entry in the packet feature table represents a value of a packet.

Specifically, in the EPON or GPON protocol, when the packet feature table carried in the packet feature response message may include one or more packet features of needing to awake the ONU, each packet feature indicates a service type.

S305: The OLT and/or the ONU detects a packet feature of a current service packet, and triggers an awaking event.

In a specific implementation process, when a user triggers a service, a service packet is transparently transmitted on the OLT or the ONU. The OLT detects a packet feature of the current service packet, and triggers an FWI awaking event if detecting that the packet feature of the current service packet is the packet feature, configured by the OLT in S304, of needing to awake the ONU. The ONU detects the packet feature of the current service packet, and triggers an LWI awaking event if detecting that the packet feature of the current service packet is the packet feature, set by the ONU in S301, of needing to awake the ONU.

In a specific implementation process, when the OLT triggers the FWI awaking event, or the ONU triggers the LWI awaking event, or both the OLT and the ONU trigger awaking events, the ONU is awoken from an energy-saving mode.

In this embodiment, an ONU sets a packet feature of needing to awake the ONU, and configures the preset packet feature for an OLT. The OLT or the ONU detects a packet feature of a current service packet. When the packet feature detected by the OLT or the ONU is the packet feature of needing to awake the ONU, an awaking event is triggered. A preset packet feature of needing to awake an ONU is used as a trigger condition for awaking the ONU. This ensures that the ONU can be awoken in time when a traffic rate at an initial service stage is small, and also meets a high QoS requirement of a service.

Embodiment 3

Figure 4:
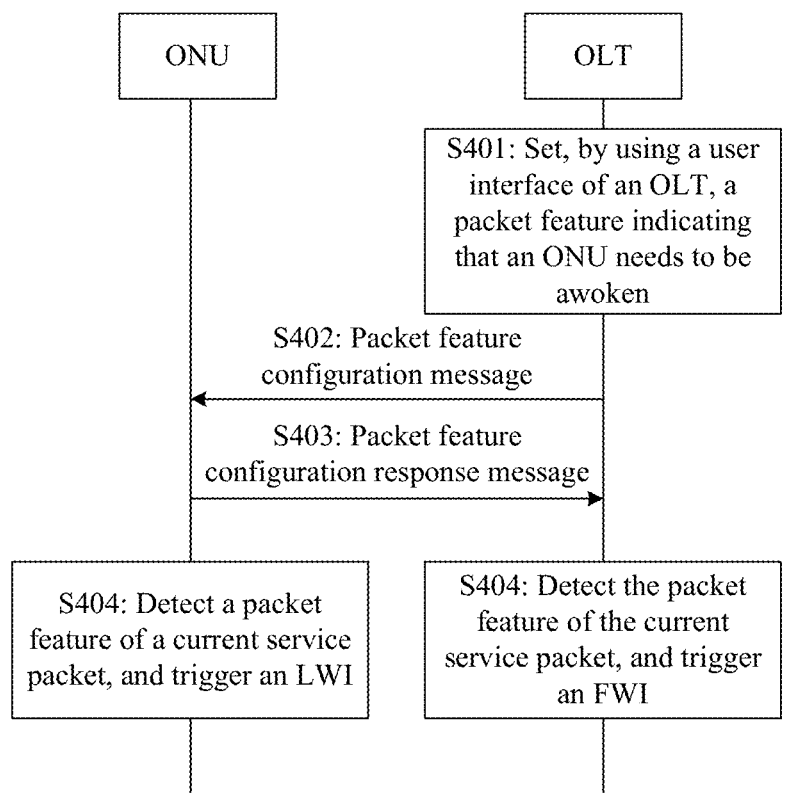
FIG. 4 is a signaling interaction diagram of a method for awaking an optical network unit ONU in a passive optical network PON according to an embodiment of the present invention.

FIG. 4 is a signaling interaction diagram of a method for awaking an optical network unit ONU in a passive optical network PON according to an embodiment of the present invention. This embodiment is applied to a scenario of a bridged ONU. The bridged ONU cannot proactively extract a packet feature of a service type. Therefore, a packet feature of needing to awake the ONU may be preset on a user interface of an OLT, the preset packet feature is configured for the ONU, and the preset packet feature of needing to awake the ONU is used as a trigger condition for awaking the ONU from an energy-saving mode. Specifically, in a GPON protocol, the OLT configures the packet feature for the ONU by newly adding a management entity. In an EPON protocol, the OLT configures the packet feature for the ONU by using an extended OAM message.

S401: Set, by using a user interface of the OLT, a packet feature of needing to awake the ONU.

The ONU is a user-side device, and engineering technical personnel need to set a packet feature on the ONU by means of a home visit, increasing service costs. Alternatively, a packet feature has been set on the ONU at delivery. If a service need of a user changes, it is inconvenient to modify a setting. Therefore, in this embodiment of the present invention, the packet feature, set on the user interface of the OLT, of needing to awake the ONU may have been set at delivery or may be set by an operator according to a service activated by a user in a use process. Specifically, the packet feature may include a VLAN ID, 802.1p, an Ethernet packet type, a DSCP value of an IP packet, a TCP port number, and a UDP port that are described in S301, and details are not described herein again. Specifically, the packet feature, set on the OLT, of needing to awake the ONU includes a packet feature of a voice service and a packet feature of a video service.

S402: The OLT sends a packet feature configuration message to the ONU.

In a specific implementation process, the packet feature configuration message sent by the OLT to the ONU carries the packet feature of needing to awake the ONU. Specifically, the packet feature, carried in the configuration message sent by the OLT to the ONU, of needing to awake the ONU includes the packet feature of the voice service and the packet feature of the video service.

In the GPON protocol, the OLT sends the packet feature configuration message to the ONU by using a newly added management entity. Specifically, the packet feature configuration message sent by the OLT to the ONU is a set message.

The message carries a packet feature table, and each entry in the packet feature table represents a value of a packet feature.

In the EPON protocol, the OLT sends the packet feature configuration message to the ONU by using an extended OAM message. Specifically, extended operation code in the message indicates that the message is an extended set request message sent by the OLT to the ONU. A branch field and a leaf field indicate that the message is a private extension. Values of both the branch field and the leaf field are customized and unique. The OAM message carries a packet feature table, and each entry in each packet feature table indicates a value of a packet feature.

Specifically, in the EPON or GPON protocol, when the packet feature table carried in the packet feature configuration message may include one or more packet feature types of needing to awake the ONU, each packet feature type indicates a service type.

S403: The ONU returns a packet feature configuration response message to the OLT.

The ONU performs packet feature configuration according to the received packet feature. After the configuration is successful, the ONU returns the packet feature response message, indicating that the packet feature is successfully configured.

In the GPON protocol, the packet feature response message returned by the ONU to the OLT is a set response message, and indicates a result of packet feature configuration by the ONU. The result includes a configuration success or a configuration failure.

In the EPON protocol, the ONU returns the packet feature response message to the OLT by using an extended OAM message. Specifically, extended operation code in the message indicates that the message is an extended set response message sent by the ONU to the OLT. A branch field and a leaf field indicate that the message is a private extension. Values of both the branch field and the leaf field are customized and unique. The OAM message further carries a result of packet feature configuration by the ONU. The result includes a configuration success or a configuration failure.

S404: The OLT and/or the ONU detects a packet feature of a current service packet, and triggers an awaking event.

In a specific implementation process, when a user triggers a service, a service packet is transparently transmitted on the OLT or the ONU. The OLT detects a packet feature of the current service packet, and triggers an FWI awaking event if detecting that the packet feature of the current service packet is the packet feature, set by the OLT in S401, of needing to awake the ONU. The ONU detects the packet feature of the current service packet, and triggers an LWI awaking event if detecting that the packet feature of the current service packet is the packet feature, configured in S403, of needing to awake the ONU.

In a specific implementation process, when the OLT triggers the FWI awaking event, or the ONU triggers the LWI awaking event, or both the OLT and the ONU trigger awaking events, the ONU is awoken from an energy-saving mode.

In this embodiment, an OLT sets a packet feature of needing to awake an ONU, and configures the preset packet feature for the ONU. The OLT or the ONU detects a packet feature of a service packet. When the packet feature detected by the OLT or the ONU is the packet feature of needing to awake the ONU, an awaking event is triggered. A packet feature of needing to awake an ONU is set on an OLT according to a user need, and the preset packet feature is used as a trigger condition for awaking the ONU. This ensures that the ONU can be awoken in time when a traffic rate at an initial service stage is small, and also meets a high QoS requirement of a service.

Embodiment 4

Figure 5:
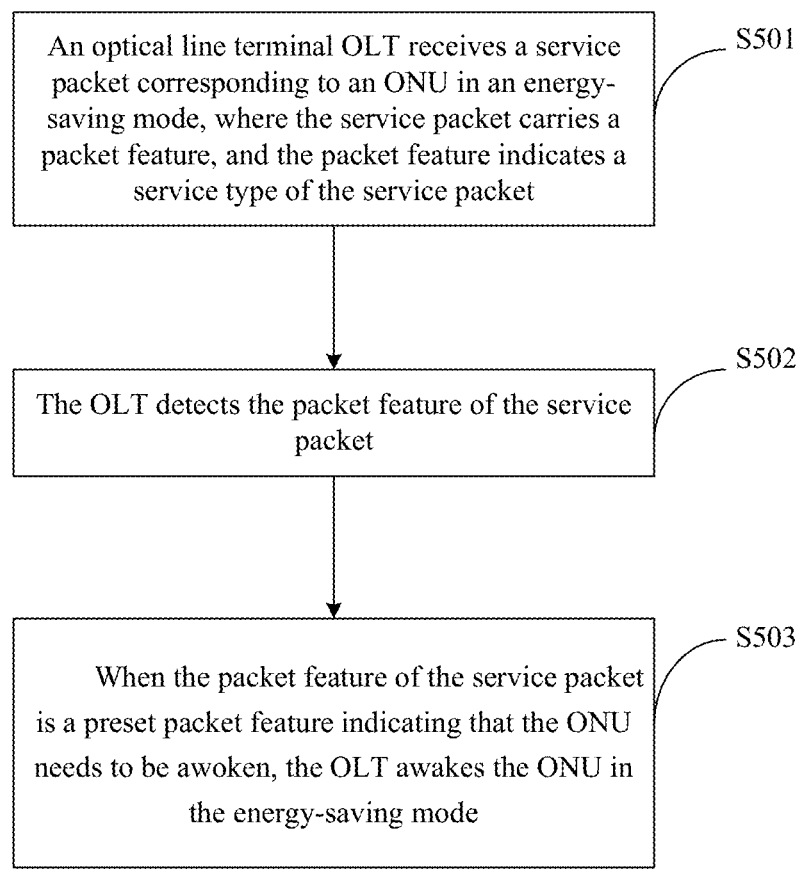
FIG. 5 is an example of a flowchart of a method for awaking an optical network unit ONU in a passive optical network PON according to an embodiment of the present invention.

FIG. 5 is an example of a flowchart of a method for awaking an optical network unit ONU in a passive optical network PON according to an embodiment of the present invention. In a specific implementation process, the method may be executed by an optical line terminal OLT, and the following steps are performed.

S501: The optical line terminal OLT receives a service packet corresponding to an ONU in an energy-saving mode, where the service packet carries a packet feature, and the packet feature indicates a service type of the service packet.

When a user triggers a service, a service packet of the service is transparently transmitted on the OLT. Specifically, the energy-saving mode includes a cyclic sleep mode. In the cyclic sleep mode, the ONU is cyclically switched between a sleep aware state and an asleep state, a receiving module and a sending module are in an enabled state when the ONU is in the sleep aware state, and the receiving module and the sending module are in a disabled state when the ONU is in the asleep state. The energy-saving mode further includes a doze mode. In the doze mode, the ONU is cyclically switched between a doze aware state and a listen state, the receiving module and the sending module are in the enabled state when the ONU is in the doze aware state, and the sending module is in the disabled state and the receiving module is in the enabled state when the ONU is in the listen state. When the ONU in the energy-saving mode is in a state in which the sending module is enabled, for example, the sleep aware state, the doze aware state, or the listen state, the OLT receives the service packet of the ONU in the energy-saving mode. Alternatively, the OLT receives the service packet that is sent to the ONU in the energy-saving mode from a network-side device.

The service type includes a voice service, a data service, a video service, and the like. The packet feature includes a VLAN ID, 802.1p, an Ethernet packet type, a DSCP value of an IP packet, a TCP port number, a UDP port, and the like. A specific implementation of indicating the service type by using the packet feature is described in detail in Embodiment 1, and details are not described herein again.

S502: The OLT detects the packet feature of the service packet.

S503: When the packet feature of the service packet is a preset packet feature of needing to awake the ONU, the OLT awakes the ONU in the energy-saving mode.

In a specific implementation process, the OLT detects the packet feature of the received service packet, and when detecting that the packet feature of the service packet is the packet feature of needing to awake the ONU, triggers an awaking event to awake the ONU that sends or receives the service packet, so that the ONU is awoken from the energy-saving mode. Specifically, before the OLT awakes the ONU, the energy-saving mode that the ONU is in includes the sleep aware state in the cyclic sleep mode, and the doze aware state and the listen state that are in the doze mode. When the ONU is in the asleep state in the cyclic sleep mode, both a receiver and a transmitter of an optical module of the ONU are in the disabled state. In this case, the OLT cannot awake the ONU directly, and may awake the ONU till the ONU is switched to the sleep aware state. Specifically, the awaking event triggered by the OLT includes a forced wakeup indication FWI flag bit at a GTC (GPON Transmission Convergence, GPON transmission convergence) layer. After the OLT awakes the ONU in the energy-saving mode, the ONU is in an active mode. In the active mode, the receiving module and the sending module of the ONU keep in the enabled state.

In a specific implementation process, the packet feature, preset on the OLT, of needing to awake the ONU may include a packet feature of the voice service. Specifically, the packet feature, preset on the OLT, of needing to awake the ONU is set in two manners. In one manner, the ONU sets the packet feature of needing to awake the ONU and sends the packet feature to the OLT, and the OLT performs packet feature configuration. A specific implementation process is described in detail in S301 to S304, and details are not described herein again. In the other manner, the packet feature is set by using a user interface of the OLT or is set at delivery.

According to the foregoing technical solution, a preset packet feature may be used as a trigger condition for awaking an ONU by an OLT. This ensures that the ONU can be awoken in time when a traffic rate at an initial service stage is small, and also meets a high QoS requirement of a service.

Embodiment 5

Figure 6:
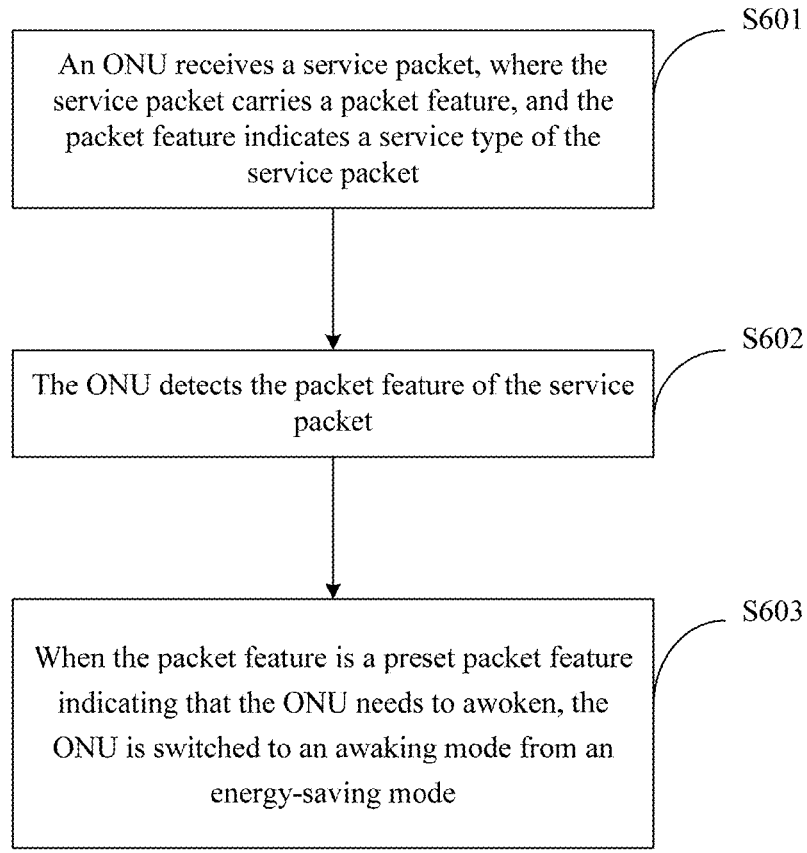
FIG. 6 is an example of a flowchart of a method for awaking an optical network unit ONU in a passive optical network PON according to an embodiment of the present invention.

FIG. 6 is an example of a flowchart of a method for awaking an optical network unit ONU in a passive optical network PON according to an embodiment of the present invention. The method may be executed by an optical network unit ONU. The ONU performs the following steps when the ONU is in an energy-saving mode.

S601: The ONU receives a service packet when the ONU is in an energy-saving mode, where the service packet carries a packet feature, and the packet feature indicates a service type of the service packet.

When a user triggers a service, a service packet of the service is transparently transmitted on the ONU. The ONU may receive the service packet from an OLT, or may receive the service packet from a user-side device. A packet header carries the packet feature indicating the service type. The service type includes a voice service, a data service, a video service, and the like. The packet feature includes a VLAN ID, 802.1p, an Ethernet packet type, a DSCP value of an IP packet, a TCP port number, a UDP port, and the like. A specific implementation of indicating the service type by using the packet feature is described in detail in Embodiment 1, and details are not described herein again. Specifically, the energy-saving mode of the ONU includes a sleep aware state and an asleep state that are in a cyclic sleep mode, and a doze aware state and a listen state that are in a doze mode. In the asleep state, the ONU can receive a packet from the user-side device.

S602: The ONU detects the packet feature of the service packet.

S603: When the packet feature is a preset packet feature of needing to awake the ONU, awake the ONU from the energy-saving mode.

In a specific implementation process, the ONU detects the packet feature of the received service packet when the ONU is in the energy-saving mode, and triggers an awaking event when the detected packet feature of the service packet is the packet feature of needing to awake the ONU, so that the ONU is awoken from the energy-saving mode. The awaking event triggered by the ONU includes a local wakeup indication LWI. When the ONU triggers an LWI awaking event, if a sending module is in a disabled state, the sending module is enabled forcibly and sends an SR (Awake) message to the OLT. The OLT sends an SA (OFF) message to the ONU. After the ONU is awoken from the energy-saving mode, the ONU is in an active mode. In the active mode, a receiving module and the sending module of the ONU keep in an enabled state.

In a specific implementation process, the packet feature, preset on the ONU, of needing to awake the ONU includes a packet feature of the voice service and a packet feature of the video service.

Specifically, the packet feature, preset on the ONU, of needing to awake the ONU is set in two manners. In one manner, the packet feature of needing to awake the ONU is set by using a user interface of the OLT and sent to the ONU, and the ONU performs packet feature configuration. A specific implementation process is described in detail in S401 to S403, and details are not described herein again. In the other manner, the ONU sets the packet feature of needing to awake the ONU, and the specific implementation described in S301 is included.

According to the foregoing technical solution, a preset packet feature may be used as a trigger condition for awaking an ONU from an energy-saving mode. This ensures that the ONU can be awoken in time when a traffic rate at an initial service stage is small, and also meets a high QoS requirement of a service.

Embodiment 6

Figure 7:
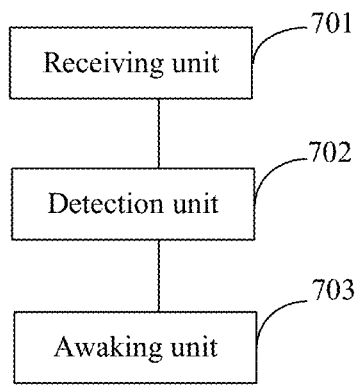
FIG. 7 is a schematic diagram of a logical structure of an optical line terminal OLT according to an embodiment of the present invention.

FIG. 7 is a schematic diagram of a logical structure of an optical line terminal OLT according to an embodiment of the present invention. As shown in FIG. 7, the OLT includes:

a receiving unit 701, configured to receive a service packet corresponding to an ONU in an energy-saving mode, where the service packet carries a packet feature, and the packet feature indicates a service type of the service packet;

a detection unit 702, configured to detect the packet feature of the service packet; and an awaking unit 703, configured to: when the packet feature is a preset packet feature of needing to awake the ONU, awake the ONU from the energy-saving mode.

Optionally, a packet feature configuration unit is further included, and is configured to: receive the preset packet feature of needing to awake the ONU, and perform packet feature configuration, where the preset packet feature is from the ONU; or set the preset packet feature of needing to awake the ONU.

According to the foregoing technical solution, a preset packet feature may be used as a trigger condition for awaking an ONU by an OLT. This ensures that the ONU can be awoken in time when a traffic rate at an initial service stage is small, and also meets a high QoS requirement of a service.

Embodiment 7

Figure 8:
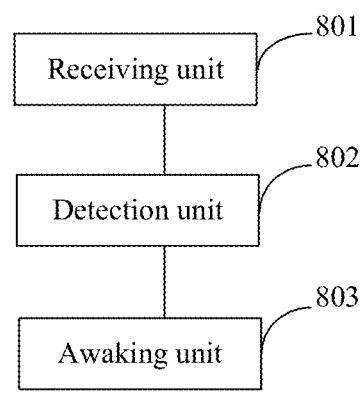
FIG. 8 is a schematic diagram of a logical structure of an optical network unit ONU according to an embodiment of the present invention.

FIG. 8 is a schematic diagram of a logical structure of an optical network unit ONU according to an embodiment of the present invention. As shown in FIG. 8, the ONU includes:

a receiving unit 801, configured to receive a service packet, where the service packet carries a packet feature, and the packet feature indicates a service type of the service packet;

a detection unit 802, configured to detect the packet feature of the service packet; and an awaking unit 803, configured to: when the packet feature is a preset packet feature of needing to awake the ONU, awake the ONU from an energy-saving mode.

Optionally, a packet feature setting unit is further included, and is configured to set the preset packet feature of needing to awake the ONU; or configured to: receive the preset packet feature of needing to awake the ONU, and perform packet feature configuration, where the preset packet feature is from an OLT.

According to the foregoing technical solution, a preset packet feature may be used as a trigger condition for awaking an ONU from an energy-saving mode. This ensures that the ONU can be awoken in time when a traffic rate at an initial service stage is small, and also meets a high QoS requirement of a service.

Embodiment 8

Figure 9:
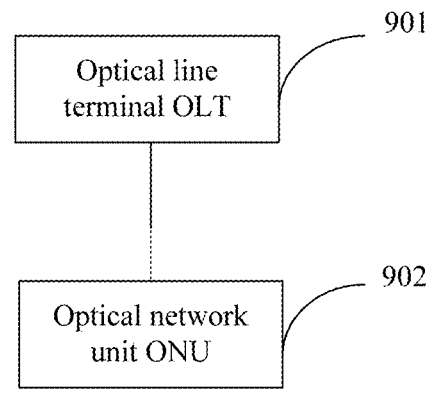
FIG. 9 is a schematic diagram of a logical structure of a passive optical network PON system according to an embodiment of the present invention.

FIG. 9 is a schematic diagram of a logical structure of a passive optical network PON system according to an embodiment of the present invention. As shown in FIG. 9, the system includes an optical line terminal OLT 901 and an optical network unit ONU 902.

The OLT 901 is configured to receive a service packet corresponding to the ONU 902 in an energy-saving mode. The service packet carries a packet feature, and the packet feature indicates a service type of the service packet. The OLT 901 is configured to: detect the packet feature of the service packet, and when the packet feature of the service packet is a preset packet feature of needing to awake the ONU 902, awake the ONU 902 in the energy-saving mode.

The ONU 902 is configured to be awoken from the energy-saving mode.

Another implementation is as follows:

The ONU 902 is configured to receive a service packet. The service packet carries a packet feature, and the packet feature indicates a service type of the service packet. The ONU 902 is configured to: detect the packet feature of the service packet, and when the packet feature of the service packet is a preset packet feature of needing to awake the ONU 902, send an awaking instruction request to the OLT 901.

The OLT 901 is configured to: receive an awaking instruction of the ONU 902, and instruct the ONU 902 to be awoken from an energy-saving mode.

According to the foregoing technical solution, a preset packet feature may be used as a trigger condition for awaking an ONU by an OLT or a trigger condition for that an ONU is proactively awoken from an energy-saving mode, and no awaking threshold needs to be determined. This ensures that the ONU can be awoken in time when a traffic rate at an initial service stage is small, and also meets a high QoS requirement of a service.

Embodiment 9

Figure 10:
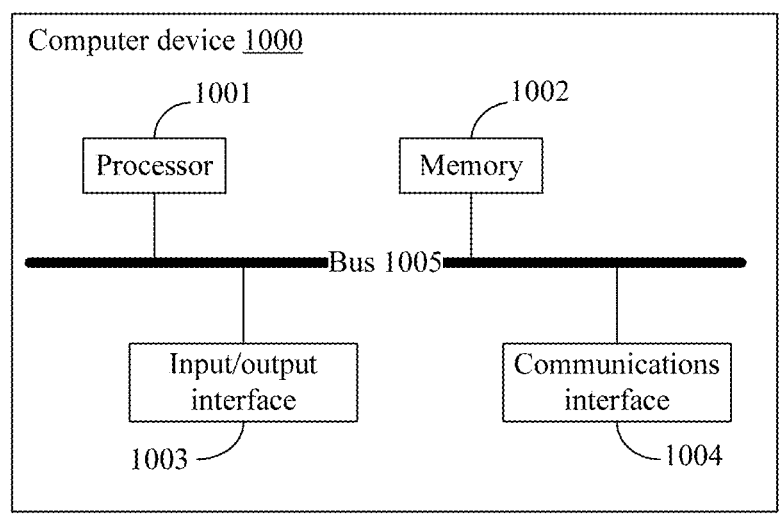
FIG. 10 is a schematic structural diagram of a computer device in a passive optical network PON according to an embodiment of the present invention.

FIG. 10 is a schematic structural diagram of a computer device 1000 in a passive optical network PON according to an embodiment of the present invention. As shown in FIG. 10, the computer device 1000 includes a processor 1001, a memory 1002, an input/output interface 1003, a communications interface 1004, and a bus 1005. The processor 1001, the memory 1002, the input/output interface 1003, and the communications interface 1004 implement communication connections between them by using the bus 1005.

The processor 1001 may use a general central processing unit (Central Processing Unit, CPU), a microprocessor, an Application-Specific Integrated Circuit (ASIC), or at least one integrated circuit, and is configured to execute a related program to implement the technical solution provided in this embodiment of the present invention.

The memory 1002 may be a read only memory (Read Only Memory, ROM), a static storage device, a dynamic storage device, or a random access memory (Random Access Memory, RAM). The memory 1002 may store an operating system and other application programs. When the technical solution provided in this embodiment of the present invention is implemented by using software or firmware, program code used for implementing the technical solution provided in this embodiment of the present invention is stored in the memory 1002, and is executed by the processor 1001.

The input/output interface 1003 is configured to receive input data and information, and output data such as an operation result.

The communications interface 1004 uses a transmission and receiving apparatus, for example, but not limited to a transceiver, to implement communication between the computer device 1000 and another device or a communications network.

The bus 1005 may include one channel, to transfer information between various components (for example, the processor 1001, the memory 1002, the input/output interface 1003, and the communications interface 1004) of the computer device 1000.

In a specific implementation process, an OLT receives, by using the communications interface 1004, a service packet corresponding to an ONU in an energy-saving mode. The service packet carries a packet feature, and the packet feature indicates a service type of the service packet. The OLT executes, by using the processor 1001, the code stored in the memory 1002, to detect the packet feature of the service packet, and when the packet feature of the service packet is a preset packet feature of needing to awake the ONU, awake the ONU in the energy-saving mode.

In a specific implementation process, an ONU receives a service packet by using the communications interface 1004. The service packet carries a packet feature, and the packet feature indicates a service type of the service packet. The ONU executes, by using the processor 1001, the code stored in the memory 1002, to detect the packet feature of the service packet, and when the packet feature of the service packet is a preset packet feature of needing to awake the ONU, awake from an energy-saving mode.

It should be noted that the computer device 1000 shown in FIG. 10 only shows the processor 1001, the memory 1002, the input/output interface 1003, the communications interface 1004, and the bus 1005, but in a specific implementation process, persons skilled in the art should understand that the computer device 1000 further includes other components necessary for normal running. In addition, according to a specific need, persons skilled in the art should understand that the computer device 1000 may further include a hardware component for implementing other additional functions. In addition, persons skilled in the art should understand that the computer device 1000 may only include components necessary for implementing this embodiment of the present invention, and does not need to include all components shown in FIG. 10.

According to the foregoing technical solution, a preset packet feature may be used as a trigger condition for awaking an ONU by an OLT or a trigger condition for that an ONU is proactively awoken from an energy-saving mode. This ensures that the ONU can be awoken in time when a traffic rate at an initial service stage is small, and also meets a high QoS requirement of a service.

In the embodiments of the present invention, only the GPON protocol and the EPON protocol are used as examples for description, but no limitation is imposed thereon. As a network evolves, a protocol of another type in the network may also use the technical solutions in the present invention, to use a packet feature as a trigger condition for awaking an ONU from an energy-saving mode, and details are not described herein again.

Persons of ordinary skill in the art may understand that, each aspect of the present invention or a possible implementation of each aspect may be specifically implemented as a system, a method, or a computer program product. Therefore, each aspect of the present invention or a possible implementation of each aspect may use forms of hardware only embodiments, software only embodiments (including firmware, resident software, and the like). In addition, each aspect of the present invention or the possible implementation of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on a function, may in fact be executed substantially at the same time, or these blocks may sometimes be executed in reverse order.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

The foregoing are merely example embodiments of the present invention. Persons skilled in the art may make various modifications and variations to the present invention without departing from the scope of the present invention.

The invention claimed is:

1. A method for awaking an optical network unit (ONU) in a passive optical network PON, wherein the method comprises:
receiving, by an optical line terminal (OLT) from the ONU, a preset packet feature of needing to awaken the ONU;
receiving, by the OLT a service packet corresponding to an ONU in an energy-saving mode, wherein the service packet carries a packet feature, and the packet feature indicates a service type of the service packet;
detecting, by the OLT, the packet feature of the service packet; and
when the packet feature of the service packet is the preset packet feature of needing to awake the ONU, awaking, by the OLT, the ONU in the energy-saving mode.

2. The method according to claim 1, wherein the preset packet feature of needing to awake the ONU comprises:
a packet feature indicating a voice service and/or a packet feature indicating a video service.

3. The method according to claim 1, wherein the energy-saving mode comprises a state in which a sending module of the ONU is enabled, and the receiving, by an OLT, a service packet corresponding to an ONU in an energy-saving mode comprises:
when the ONU in the energy-saving mode is in the state in which the sending module is enabled, receiving, by the OLT, the service packet of the ONU in the energy-saving mode.

4. The method according to claim 1, wherein the receiving, by an OLT, a service packet corresponding to an ONU in an energy-saving mode comprises:
receiving, by the OLT, the service packet that is sent to the ONU in the energy-saving mode from a network-side device.

5. The method according to claim 1, wherein the energy-saving mode comprises a state in which a receiving module of the ONU is enabled, and the awaking, by the OLT, the ONU in the energy-saving mode comprises:
when the ONU in the energy-saving mode is in the state in which the receiving module is enabled, awaking, by the OLT, the ONU in the energy-saving mode.

6. The method according to claim 1, wherein the energy-saving mode comprises a cyclic sleep mode, wherein in the cyclic sleep mode, the ONU is cyclically switched between a sleep aware state and an asleep state, the receiving module and the sending module are in the enabled state when the ONU is in the sleep aware state, and the receiving module and the sending module are in a disabled state when the ONU is in the asleep state.

7. The method according to claim 1, wherein the energy-saving mode comprises a doze mode, wherein in the doze mode, the ONU is cyclically switched between a doze aware state and a listen state, the receiving module and the sending module are in the enabled state when the ONU is in the doze aware state, and the sending module is in a disabled state and the receiving module is in the enabled state when the ONU is in the listen state.

8. A method for awaking an optical network unit (ONU) in a passive optical network (PON), comprising:
transmitting, by the ONU, a preset packet feature of needing to awaken the ONU;
receiving, by the ONU, a service packet when the ONU is in an energy-saving mode, wherein the service packet carries a packet feature, and the packet feature indicates a service type of the service packet;
detecting, by the ONU, the packet feature of the service packet; and
when the packet feature is the preset packet feature of needing to awake the ONU, awaking the ONU from the energy-saving mode.

9. The method according to claim 8, wherein the preset packet feature of needing to awake the ONU comprises:
a packet feature indicating a voice service and/or a packet feature indicating a video service.

10. The method according to claim 8, wherein the receiving, by an ONU, a service packet when the ONU is in an energy-saving mode comprises:
receiving, by the ONU, the service packet from a user-side device.

11. The method according to claim 8, wherein the energy-saving mode comprises a state in which a receiving module of the ONU is enabled, and the receiving, by an ONU, a service packet when the ONU is in an energy-saving mode comprises:
receiving, by the ONU, the service packet from a network-side device.

12. An optical line terminal (OLT), wherein the OLT comprises:
a memory to store instructions; and
a processor to execute the instructions to configure the OLT to:
receive from an Optical Network Unit (ONU), a preset packet feature of needing to awaken the ONU,
receive a service packet corresponding to the Optical Network Unit (ONU) in an energy-saving mode, wherein the service packet carries a packet feature, and the packet feature indicates a service type of the service packet;
detect the packet feature of the service packet; and
when the packet feature of the service packet is the preset packet feature of needing to awake the ONU, awake, by the OLT, the ONU in the energy-saving mode.

13. The OLT according to claim 12, wherein the preset packet feature of needing to awake the ONU comprises:
a packet feature of a voice service and/or a packet feature indicating a video service.

14. An optical network unit (ONU), wherein the ONU comprises:
a memory to store instructions; and
a processor to execute the instructions to configure the ONU to:
transmit, by the ONU, a preset packet feature of needing to awaken the ONU;
receive a service packet, wherein the service packet carries a packet feature, and the packet feature indicates a service type of the service packet;
detect the packet feature of the service packet; and
when the packet feature is a preset packet feature of needing to awake the ONU, awake the ONU from the energy-saving mode.

15. The ONU according to claim 14, wherein the processor further executes the instructions to configure the ONU to set the preset packet feature of needing to awake the ONU.

16. A passive optical network (PON) system, comprising:
an Optical Line Terminal (OLT); and
an Optical Network Unit (ONU) configured to a preset packet feature of needing to awaken the ONU, wherein the OLT is configured to:
receive from the Optical Network Unit (ONU), the preset packet feature of needing to awaken the ONU;
receive a service packet corresponding to the ONU in an energy-saving mode, wherein the service packet carries a packet feature, and the packet feature indicates a service type of the service packet; and
detect the packet feature of the service packet, and when the packet feature of the service packet is the preset packet feature of needing to awake the ONU, awake the ONU in the energy-saving mode; and
the ONU is configured to be awoken from the energy-saving mode.

17. A passive optical network (PON) system comprising:
an Optical Line Terminal (OLT); and
an Optical Network Unit (ONU) in an energy-saving mode and configured to:
receive a service packet carrying a packet feature, and the packet feature indicates a service type of the service packet; and
to detect the packet feature of the service packet, and when the packet feature of the service packet is a preset packet feature of needing to awake the ONU, send an awaking instruction request to the OLT; and
the OLT is configured to: receive an awaking instruction request of the ONU, and instruct the ONU to be awoken from the energy-saving mode.

* * * * *

UNITED STATES PATENT AND TRADEMARK OFFICE
CERTIFICATE OF CORRECTION

PATENT NO.        : 10,284,298 B2
APPLICATION NO.   : 15/635992
DATED             : May 7, 2019
INVENTOR(S)       : Haixiong Liu et al.

It is certified that error appears in the above-identified patent and that said Letters Patent is hereby corrected as shown below:

In the Claims

Column 21, Line 39:
In Claim 12, after "awaken the" delete "ONU," and insert -- ONU; --, therefor.

Signed and Sealed this
Nineteenth Day of November, 2019

Andrei Iancu
*Director of the United States Patent and Trademark Office*